US008816826B2

(12) United States Patent
Colby

(10) Patent No.: US 8,816,826 B2
(45) Date of Patent: Aug. 26, 2014

(54) PASSIVE RADIO FREQUENCY DATA LOGGER

(76) Inventor: Steven M. Colby, Los Alto Hills, CA (US)

( * ) Notice: Subject to any disclaimer, the term of this patent is extended or adjusted under 35 U.S.C. 154(b) by 440 days.

(21) Appl. No.: 12/577,209

(22) Filed: Oct. 12, 2009

(65) Prior Publication Data

US 2010/0026466 A1 Feb. 4, 2010

Related U.S. Application Data

(63) Continuation of application No. 11/468,026, filed on Aug. 29, 2006, now abandoned, which is a continuation-in-part of application No. 11/382,054, filed on May 8, 2006, now abandoned.

(60) Provisional application No. 60/678,428, filed on May 6, 2005, provisional application No. 60/685,331, filed on May 27, 2005, provisional application No. 60/700,884, filed on Jul. 19, 2005, provisional application No. 60/712,308, filed on Aug. 30, 2005, provisional application No. 60/715,641, filed on Sep. 10, 2005, provisional application No. 60/752,933, filed on Dec. 21, 2005, provisional application No. 60/758,751, filed on Jan. 13, 2006, provisional application No. 60/782,068, filed on Mar. 13, 2006, provisional application No. 60/744,154, filed on Apr. 3, 2006, provisional application No. 60/746,636, filed on May 6, 2006.

(51) Int. Cl.
*H04Q 5/22* (2006.01)

(52) U.S. Cl.
USPC ... 340/10.34; 340/4.32; 340/10.4; 340/12.25; 707/999.107

(58) Field of Classification Search
CPC ............ G06K 7/0008; G06K 19/0723; G06K 19/07749; G06K 19/0701
USPC .......................... 340/10.4, 10.34, 4.32, 12.25; 707/104.1, 999.107, 802
See application file for complete search history.

(56) References Cited

U.S. PATENT DOCUMENTS

| 4,575,601 A | 3/1986 | Taguchi et al. |
| 4,744,497 A | 5/1988 | O'Neal |
| 5,206,495 A | 4/1993 | Kreft |
| 5,327,115 A | 7/1994 | Swierczek |

(Continued)

FOREIGN PATENT DOCUMENTS

WO 0016570 3/2000

OTHER PUBLICATIONS

Carlos Vila Deutschbein, "Digital Frequency Shifting for Electroacoustic Feedback Suppression" in Audo Engineering Society Conventino Paper. Present at the 118th Convention May 28-31, 2005 Barcelona, Spain. (p. 1).
"RFID Powder" Scientific American, pp. 68-71, Feb. 2008.
Juels, Ari, et al., Security and Privacy Issues in E-passports, SECURECOMM'05, vol. 00 2005, Sep. 5, 2009, 13 pages.
Peterson, Erik, Issues First e-passports to diplomats, citizen issuance to start later in '06, SecureID News, Apr. 20, 2006, 3 pages.
Moss, Frank, How the U.S. Passport Program Enhances Border Security, travel.state.gov, Jun. 22, 2005, 5 pages.

(Continued)

*Primary Examiner* — Omer S Khan

(57) ABSTRACT

A radio frequency identification device is configured as a data logger. In a logging mode the radio frequency identification device logs information received from a transmitter. In an upload mode the radio frequency identification device is configured to upload to a receiver logged information and/or information identifying the radio frequency identification device. Optionally, the logging mode is used when there is insufficient power to send a readable response signal to the transmitter.

30 Claims, 3 Drawing Sheets

(56) References Cited

U.S. PATENT DOCUMENTS

| | | | |
|---|---|---|---|
| 5,380,046 | A | 1/1995 | Stephens |
| 5,506,395 | A | 4/1996 | Eppley |
| 5,521,590 | A | 5/1996 | Hanaoka et al. |
| 5,538,291 | A | 7/1996 | Gustafson |
| 5,640,151 | A | 6/1997 | Reis et al. |
| 5,686,902 | A | 11/1997 | Reis et al. |
| 5,700,037 | A | 12/1997 | Keller |
| 5,847,662 | A | 12/1998 | Yokota et al. |
| 5,966,082 | A | 10/1999 | Cofino et al. |
| 6,130,602 | A | 10/2000 | O'Toole et al. |
| 6,144,299 | A * | 11/2000 | Cole .................... 340/572.1 |
| 6,158,777 | A | 12/2000 | Twardosz |
| 6,199,762 | B1 | 3/2001 | Hohle |
| 6,282,407 | B1 | 8/2001 | Vega et al. |
| 6,320,169 | B1 | 11/2001 | Clothier |
| 6,471,127 | B2 | 10/2002 | Pentz et al. |
| 6,531,964 | B1 | 3/2003 | Loving |
| 6,593,845 | B1 | 7/2003 | Friedman et al. |
| 6,719,206 | B1 | 4/2004 | Bashan et al. |
| 7,015,791 | B2 | 3/2006 | Huntzicker |
| 7,218,233 | B2 | 5/2007 | Bon |
| 7,246,754 | B2 | 7/2007 | Siuta et al. |
| 7,290,709 | B2 | 11/2007 | Tsai et al. |
| 7,446,646 | B2 | 11/2008 | Huomo |
| 7,591,415 | B2 | 9/2009 | Jesme |
| 7,719,425 | B2 | 5/2010 | Colby |
| 7,924,156 | B2 | 4/2011 | Colby |
| 2001/0017799 | A1* | 8/2001 | Chen et al. ............... 365/200 |
| 2002/0017557 | A1* | 2/2002 | Hendrick ................. 235/380 |
| 2002/0047777 | A1 | 4/2002 | Casden |
| 2002/0117243 | A1 | 8/2002 | Koren |
| 2003/0014891 | A1 | 1/2003 | Nelms et al. |
| 2003/0030568 | A1* | 2/2003 | Lastinger et al. ........ 340/825.49 |
| 2003/0042318 | A1* | 3/2003 | Krishna et al. ........... 235/492 |
| 2003/0057286 | A1 | 3/2003 | Yamagishi et al. |
| 2003/0095034 | A1 | 5/2003 | Clothier |
| 2003/0209601 | A1* | 11/2003 | Chung ..................... 235/385 |
| 2004/0089724 | A1 | 5/2004 | Lasch et al. |
| 2004/0145453 | A1 | 7/2004 | Tuttle |
| 2004/0169087 | A1 | 9/2004 | Lasch et al. |
| 2004/0212503 | A1* | 10/2004 | Stilp ....................... 340/572.1 |
| 2004/0233040 | A1 | 11/2004 | Lane et al. |
| 2004/0237360 | A1 | 12/2004 | Nelms et al. |
| 2004/0256469 | A1 | 12/2004 | Faenza, Jr. et al. |
| 2004/0263319 | A1 | 12/2004 | Huomo |
| 2005/0011776 | A1 | 1/2005 | Nagel |
| 2005/0093703 | A1* | 5/2005 | Twitchell, Jr. ............. 340/572.8 |
| 2005/0145688 | A1* | 7/2005 | Milenkovic et al. .......... 235/375 |
| 2005/0171898 | A1 | 8/2005 | Bishop et al. |
| 2005/0174239 | A1 | 8/2005 | Shanks et al. |
| 2005/0192053 | A1 | 9/2005 | Kao et al. |
| 2005/0205665 | A1 | 9/2005 | Lasch et al. |
| 2005/0207229 | A1* | 9/2005 | Takeuchi ................ 365/185.25 |
| 2005/0242950 | A1 | 11/2005 | Lindsay et al. |
| 2005/0253683 | A1 | 11/2005 | Lowe |
| 2005/0263591 | A1 | 12/2005 | Smith |
| 2005/0274794 | A1 | 12/2005 | Bason et al. |
| 2006/0005050 | A1 | 1/2006 | Basson et al. |
| 2006/0109084 | A1* | 5/2006 | Yarvis ......................... 340/10.1 |
| 2006/0164250 | A1 | 7/2006 | Kawai |
| 2006/0186989 | A1 | 8/2006 | Chon et al. |
| 2006/0187040 | A1 | 8/2006 | Sweeney |
| 2006/0245530 | A1* | 11/2006 | Pradhan et al. ............. 375/364 |
| 2006/0254815 | A1 | 11/2006 | Humphrey et al. |
| 2007/0024423 | A1 | 2/2007 | Nikitin et al. |
| 2007/0057790 | A1 | 3/2007 | Alden et al. |
| 2007/0057792 | A1 | 3/2007 | Alden |
| 2007/0075140 | A1 | 4/2007 | Guez et al. |
| 2007/0090927 | A1 | 4/2007 | Potyrailo et al. |
| 2007/0152829 | A1 | 7/2007 | Lindsay et al. |
| 2007/0194116 | A1 | 8/2007 | Arnold |
| 2008/0238679 | A1 | 10/2008 | Rofougaran et al. |

OTHER PUBLICATIONS

Unknown CDT Working Group on RFID: Privacy Best Practices for Deployment of RFID Technology, www.cdt.org, May 1, 2006, 7 pages.

Moss, Frank, Statement, Committee on International Relations, wwwc.house.gov, Jun. 23, 2004, 4 pages.

Goo, Sara Kehaulani, Security Concerns Prompt Passport Redesign, www.washingtonpost.com, Apr. 30, 2005, 3 pages.

Unknown, Information Security Radio Frequency Identification Technology in the Federal government, GAO-05-551, May 27, 2005, 41 pages.

Yoshida, Junko, Tests Reveal e-Passport Security Flaw, www.eetimes.com, Aug. 30, 2004, 3 pages.

Unknown Characteristics of Metal Shielding Textiles, www.rfsafe.com, printed Aug. 2005, 2 pages.

Unknown EMF Shielding & Conductive Fabrics, www.lessemf.com/fabric.html, The EMF Safety Superstore, Aug. 4, 2005, 12 pages.

Yu, Roger, Electronic Passports Set to Thwart Forgers, USATODAY, Aug. 8, 2005, 4 pages.

Schneier, Bruce, Schneier on Security, A Weblog Covering Security and Security Technology, Nov. 3, 2005, 18 pages.

Schneier, Bruce, Schneier on Security, a Weblog Covering Security and Security Technology, Aug. 9, 2005, 19 pages.

Unknown Spy Blog, Foiling the Oyster Card, Feb. 16, 2004, 5 pages.

Unknown www.WalletGard.com/contact.html, Protect Yourself Against Identity Theft, Revised Feb. 19, 2006, 2 pages.

U.S. Appl. No. 11/350,309, filed Feb. 27, 2006, Colby, Steven M., Non-Final Office Action issued May 14, 2008, 9 pages.

U.S. Appl. No. 11/350,309, filed Feb. 27, 2006, Colby, Steven M., Non-Final Office Action issued Jan. 12, 2009, 14 pages.

U.S. Appl. No. 11/350,309, filed Feb. 27, 2006, Colby, Steven M., Final Office Action issued Sep. 23, 2009, 15 pages.

U.S. Appl. No. 11/350,309, filed Feb. 27, 2006, Colby, Steven M., Notice of Allowance and Allowability, issued Jan. 11, 2010.

U.S. Appl. No. 12/777,474, filed May 11, 2010, Colby, Steven M., Non-Final Office Action issued Feb. 18, 2011, 7 pages.

U.S. Appl. No. 12/777,474, filed May 11, 2010, Colby, Steven M., Non-Final Office Action issued Dec. 28, 2011, 13 pages.

U.S. Appl. No. 11/420,721, filed May 26, 2006, Colby, Steven M., Non-Final Office Action issued Apr. 8, 2009, 18 pages.

U.S. Appl. No. 13/084,433, filed Apr. 11, 2011, Colby, Steven M., entitled Transaction Card Including Switchable RFID Tag.

U.S. Appl. No. 11/468,026, filed Aug. 29, 2006, Colby, Steven M., Non-Final Office Action issued Apr. 10, 2009, 22 pages.

U.S. Appl. No. 11/382,050, filed May 7, 2006, Colby, Steven M., Non-Final Office Action issued Apr. 8, 2009, 15 pages.

U.S. Appl. No. 11/382,052 filed May 7, 2006, Colby, Steven M., Non-Final Office Action issued Apr. 8, 2009, 18 pages.

U.S. Appl. No. 11/382,265, filed May 8, 2006, Colby, Steven M., Non-Final Office Action issued Apr. 10, 2009, 16 pages.

U.S. Appl. No. 11/382,054, filed May 8, 2006, Colby, Steven M., Non-Final Office Action issued Apr. 10, 2009, 17 pages.

U.S. Appl. No. 11/382,053, filed May 7, 2006, Colby, Steven M., Non-Final Office Action issued Apr. 8, 2009, 19 pages.

U.S. Appl. No. 12/577,209, filed Oct. 12, 2009, Colby, Steven M., Non-Final Office Action issued Mar. 21, 2012, 22 pages.

U.S. Appl. No. 12/577,2009, filed Oct. 12, 2009, Colby, Steven M. Final Rejection, 24 pages.

RFID Powder, Scientific American, Feb. 2008, 6 pages.

PCT/US99/21073, International Search Report dated Dec. 2, 1999, 3 pages.

U.S. Appl. No. 11/458,620, filed Jul. 19, 2006, Colby, Steven M., Non-Final Office Action issued Jun. 24, 2010, 6 pages.

U.S. Appl. No. 11/458,620, filed Jul. 19, 2006, Colby, Steven M., Non-Final office Action issued Mar. 30, 2009, 19 pages.

U.S. Appl. No. 11/350,309, filed Feb. 27, 2006, Colby, Steven M., Non-Final Office Action issued Feb. 19, 2008, 5 pages.

U.S. Appl. No. 11/458,620, filed Jul. 19, 2006, Colby, Steven M., Non-Final Office Action issued Dec. 14, 2009.

* cited by examiner

PASSIVE RADIO FREQUENCY DATA LOGGER

CROSS-REFERENCE TO RELATED APPLICATIONS

This application is a continuation of U.S. nonprovisional patent application Ser. No. 11/468,026 filed Aug. 29, 2006, now abandoned
which in turn claims priority and benefit of U.S. provisional patent application 60/712,308 filed Aug. 30, 2005 and was a continuation-in-part of U.S. nonprovisional patent application Ser. No. 11/382,054 filed May 8, 2006,
which in turn claims benefit and priority to U.S. provisional patent applications:
60/678,428 filed May 6, 2005;
60/685,331 filed May 27, 2005,
60/700,884 filed Jul. 19, 2005;
60/712,308 filed Aug. 30, 2005;
60/715,641 filed Sep. 10, 2005;
60/752,933 filed Dec. 21, 2005;
60/758,751 filed Jan. 13, 2006;
60/782,068 filed Mar. 13, 2006;
60/744,154 filed Apr. 3, 2006, and
60/746,636 filed May 6, 2006;
The disclosures of the above provisional and nonprovisional patent applications are hereby incorporated herein by reference.

BACKGROUND

RFID tags are used to track items such as inventory. The tracking process involves sending an RF signal to the tag and receiving a response signal at a tag reader. The tag reader receives a serial number or other information from the tag and stores the received data. Problems can occur when many tags are within range of the reader and their responses interfere with each other or when signals are attenuated by distance or interference. Further, the RF energy required to read a tag must be strong enough for the tag to generate the response signal. This limits the range at which RFID tags can be used.

SUMMARY

A passive radio frequency data logger is configured to operate in at least two different modes. In a log data mode the passive radio frequency data logger is configured to receive a radio frequency signal from a transmitter, to use energy from the radio frequency signal to power an integrated circuit, and to store data encoded in the radio frequency signal in the integrated circuit. In an upload data mode, data previously stored in the integrated circuit in the log data mode is uploaded from the passive radio frequency data logger. The upload process is optionally powered by a radio frequency signal received by the passive radio frequency data logger. The upload process optionally includes uploading data stored in a plurality of separate storage events. The log data mode and the upload mode are optionally configured to use different radio frequencies.

The passive radio frequency data logger is configured to be switched between the log data mode and the upload mode. In some embodiments, the mode is switched by attaching the passive radio frequency data logger to an electrical circuit. In some embodiments, the mode is switched using a command received in a radio frequency signal. In some embodiments, the mode is switched as a result of communications with a transmitter. In some embodiments, the mode is switched responsive to an amount of energy received from a radio frequency signal.

The stored data may include a serial numbers of one or more transmitter, time and date information received from the one or more transmitter, temperature information, or the like.

The passive radio frequency data logger optionally includes sensors, such as a temperature, light, or humidity sensors, powered by the received radio frequency signal.

Some embodiments include an item tracking system. The item tracking system including a database, a plurality of passive radio frequency data loggers, and a plurality of transmitter points each including at least one transmitter. Each transmitter is configured to transmit a radio frequency signal for receipt by one or more of the passive radio frequency data loggers. The radio frequency signal includes data to identify each transmitter, such as a location, time or serial number.

In a typical application, passive radio frequency data loggers are attached to goods to be tracked. As the good pass by transmitters, they receive and save the data identifying the transmitter. The saved information optionally includes time and date information. The mode of the passive radio frequency data logger is changed and the saved information is uploaded to a database. The uploaded information includes a record of where, and optionally when, the data logger has been.

Because the data logger does not generate a response signal in the logging mode, the initial transmission need not be strong enough to power the response signal. This significantly, increases the utility of the data logger in comparison with RFID tags of the prior art. Further, in the log data mode, the presence of many data loggers does not interfere with communications from transmitters to data loggers.

Various embodiments of the invention include a system comprising a first transmitter configured to transmit a first RF signal including identification data configured to identify the first transmitter, a logger configured to receive the RF signal transmitted by the first transmitter, to convert the RF signal into electrical energy, and to use the electrical energy to store the identification data in static memory storage within the logger, the static memory storage being configured to simultaneously store a plurality of identification data received from a plurality of transmitters, a second transmitter configured to communicate a second signal to the logger and to receive a first reply signal, the first reply signal including the plurality of identification data stored in the static memory, and a database server configured to store the plurality of identification data received in the first reply signal.

Various embodiments of the invention include a passive radio frequency logger comprising a power circuit configured to convert RF signals into electrical energy, a log data storage including static memory configured to store a plurality of identification information received in a plurality of RF signals, the plurality of identification information being configured to identify a plurality of transmitters, a processor configured to store one or more members of the plurality of identification information in the log data storage using the electrical, and an antenna configured to receive the plurality of RF signals including the plurality of identification information, and configured to transmit a reply signal using the electrical energy, the reply signal including the plurality of identification information stored in the log data storage.

Various embodiments of the invention include a method comprising receiving a first radio frequency transmission including first identification data configured to identify a sender of the first radio frequency transmission, using the first radio frequency transmission to generate first electrical energy, storing the first identification data in a log data storage using the first electrical energy, receiving a second radio frequency transmission including second identification data configured to identify a sender of the first radio frequency transmission, using the second radio frequency transmission to generate second electrical energy, storing the second identification data in the log data storage using the second electrical energy, switching from a logging mode to an upload mode, and uploading the first identification data and the second identification data stored in the log data storage, in the upload mode.

Various embodiments of the invention include a system comprising a time source configured to provide a current time, a memory configured to store a transmitter identification, and a first radio frequency transmitter configured to produce a radio frequency signal including the current time and the transmitter identification, the radio frequency signal configured to power a passive radio frequency device configured to receive and store the current time and transmitter identification.

Various embodiments of the invention include a system comprising an antenna configured to receive an RF signal including identification information associated with a transmitter of the RF signal, a power circuit configured to convert the RF signal into electrical energy, a log data storage including static memory configured to store a plurality of identification information received in a plurality of RF signals including the identification information included in the RF signal, a processor configured to store the identification information in the log data storage using the electrical energy, and an output configured to upload the plurality of identification information to an uploader.

Various embodiments of the invention include a method comprising receiving a first radio frequency (RF) transmission including first identification data configured to identify a sender of the first radio frequency transmission, generating electrical energy using the first radio frequency transmission, logging the first identification data in a log data storage using the electrical energy, changing from a logging mode to an upload mode, and uploading the first identification data stored in the log data storage in the upload mode.

DETAILED DESCRIPTION

The invention includes a passive data logger and/or a system for supporting a passive data logger. The data logger of the invention is passive in that, in some modes, it operates using energy received from a radio frequency (RF) transmission to perform data storage functions and optionally to perform data uploading operations. Thus, in some embodiments, the passive data logger does not include an independent power source, such as a battery.

In some embodiments, the passive data logger may be used to track objects by attaching the passive data logger to the object, recording the times that the passive data logger passes by specific transmitters, and uploading the recorded tracking data from the passive data logger to an uploader device.

Because logging of an event is not dependent on transmitting an RF signal from a transmitter to the passive data logger with enough energy to generate a readable response signal, the fact that a passive data logger passed near a transmitter can be logged even when the energy of the transmitted RF signal is insufficient to generated a readable response signal.

Because logging of an event is not dependent on transmitting an RF signal from a transmitter to the passive data logger and receiving a response signal that can be differentiated from response signals generated by other devices, the fact that a passive data logger passed near a transmitter can be logged regardless of how many other RF devices are nearby.

Figure 1:
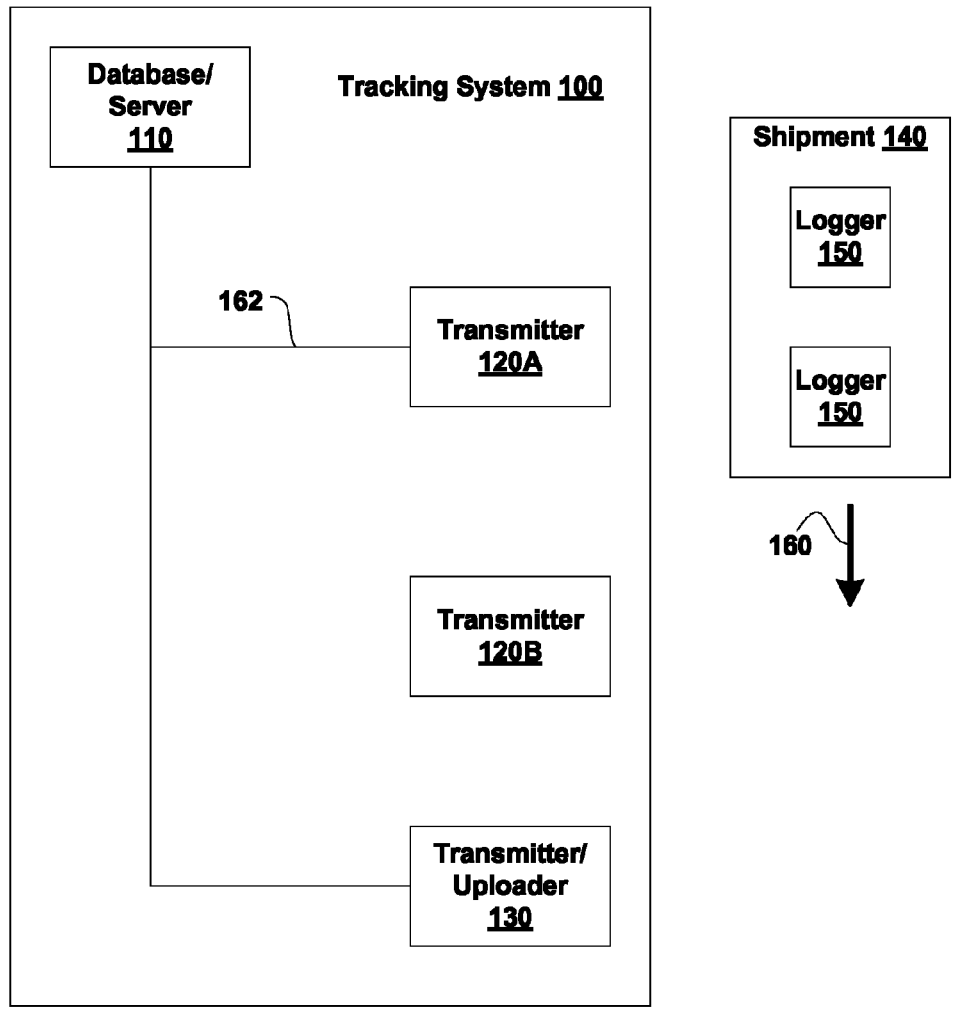
FIG. 1 illustrates a tracking system, according to various embodiments of the invention.

FIG. 1 illustrates a tracking system 100, according to various embodiments of the invention. Tracking System 100 includes a Databass/Server 110, one or more Transmitters 120 (e.g., 120A and 120B). Tracking System 100 further includes a Transmitter/Uploader 130. Tracking System 100 is configured to monitor (e.g., exchange data with and/or track) one or more Logger 150, optionally included in a Shipment 140.

Database/Server 110 is configured to receive logging data uploaded from one or more Logger 150 using Transmitter/Uploader 130. Database/Server 100 may further be configured to identify the locations and/or conditions of one or more instances of Logger 150 at specific times based on time/date data, transmitter serial number data, and/or the like included in the logging data uploaded from the one or more Logger 150.

Transmitter 120A is configured to transmit data to be received and stored by one or more instance of Logger 150. For example, in various embodiments, Transmitter 120A is configured to transmit location information, a serial number of Transmitter 120A, sensor (e.g., temperature or humidity) data, time/date data (e.g., a time of day and/or date), and/or the like. In some embodiments, Transmitter 120A is positioned near a tracking checkpoint such as a loading dock, a conveyor belt, or other of the various tracking checkpoints known in the art. Some of such tracking checkpoints are used to detect RFID tags in the prior art. Transmitter 120A optionally includes a Communication Channel 162 configured to convey data to or from Database/Server 110. In some embodiments, Communication Channel 162 is configured to transmit serial number, time/data, and/or location data to Transmitter 120A.

In some embodiments, Transmitter 120A includes a global positioning system or local positioning system configured to generate position information for transmission to one or more instances of Logger 150.

Optional Transmitter 120B is optionally a further embodiment of Transmitter 120A. Transmitter 120B optionally does not include an instance of Communication Channel 162. Embodiments of Tracking System 100 optionally include more instances of Transmitter 120A or Transmitter 120B than are shown in FIG. 1. For example, in some embodiments, Tracking System 100 includes instances of Transmitter 120A distributed along a product distribution system.

Transmitter/Uploader 130 is configured to upload data from Logger 150. The uploaded data includes data received from Transmitter 120A or Transmitter 120B and stored by Logger 150. Transmitter/Uploader 130 is optionally further configured to operate as an instance of Transmitter 120A. Thus, Transmitter/Uploader 130 may be configured to both transmit data to an instance of Logger 150 and to upload data from that instance of Logger 150. As is described further herein, whether Transmitter/Uploader 130 merely transmits data to Logger 150 or uploads data from Logger 150 is optionally dependent on the quality (e.g., reliability) of wireless data transmission, or on the desires of a user of Transmitter/Uploader 130. For example, Transmitter/Uploader 130 be configured to first test whether reliable communication can be accomplished with an instance of Logger 150. If communications satisfy requirements, then data may be uploaded from Logger 150. If communications do not satisfy requirements, then Transmitter/Uploader 130 may merely transmit data for storage on Logger 150.

Transmitter/Uploader 130 and Logger 150 are optionally configured to use different radio frequencies in the logging mode and the upload mode. For example, in some embodiments the logging mode uses a frequency less susceptible to interferences relative to a frequency used in the upload mode. In one embodiments, the frequency used in the logging mode is selected to better transmit through water, packaging, containers, or the like, relative to the frequency in the upload mode. In some embodiments, different frequencies are used for power transfer and data transfer. In some embodiments, power is transferred inductively while data is transferred through an propagating radio frequency signal.

Logger 150 optionally includes two antenna or a tunable antenna in order to communication at two different frequencies.

In various embodiments, changing mode between the logging mode and uploading mode is accomplished by sending a transmission from Transmitter/Uploader 130 to Logger 150. The transmission including a command configured to change the mode of Logger 150.

In some embodiments, the mode of Logger 150 is dependent on the frequency of signals received. For example, if a signal of a first frequency is received then Logger 150 is automatically placed in the logging mode and if a signal of a second frequency is receive then Logger 150 is automatically placed in the upload mode. Optionally, one frequency is used for data transmission while another frequency is used for communication mode change commands.

In various embodiments, changing mode between the logging mode and uploading mode is accomplished by bringing an external electrical connector in physical contact with Logger 150. In these embodiments, Logger 150 may optionally receive electrical power from the external electrical contact.

When the mode is changed to the uploading mode the mode may return to the logging mode through several alternative processes. In some embodiments, the mode switches back to the logging mode automatically after a time delay, automatically after uploading is complete, automatically after power is no longer obtained from a transmission, disconnecting an external electrical connector, after receiving a command through an RF transmission, and/or the like.

In various embodiments, the default mode is the upload mode. In some of these embodiments, the mode is automatically switched to the logging mode when there is insufficient power, or inadequate communications, for a successful reply transmission.

Figure 2:
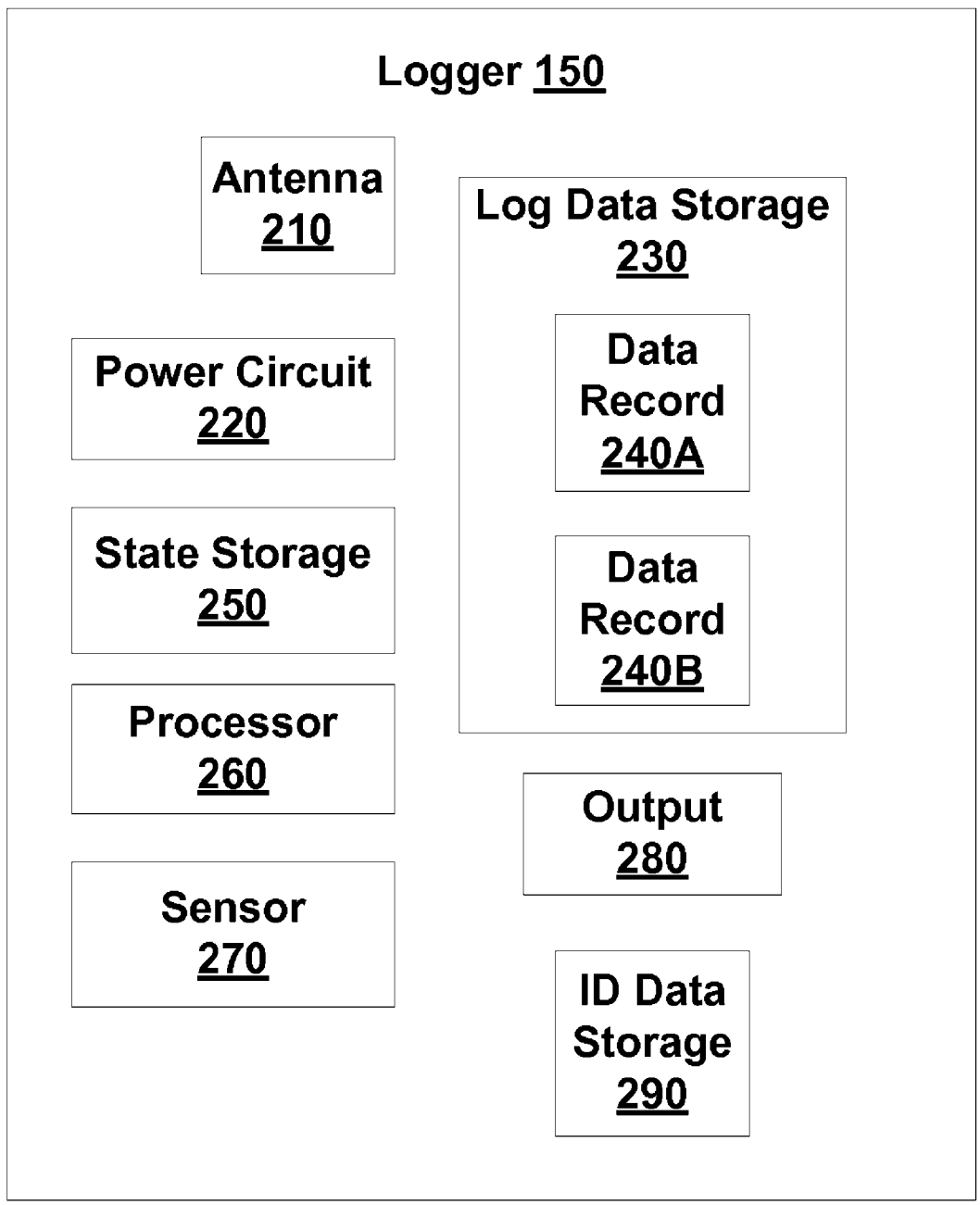
FIG. 2 illustrates a passive data logger, according to various embodiments of the invention.

FIG. 2 illustrates further details of Logger 150, according to various embodiments of the invention. Logger 150 includes one or more Antenna 210 configured to receive a transmission from a transmitter, such as Transmitter 120A, Transmitter 120B, Transmitter/Uploader 130, and/or the like. Antenna 210 is optionally further configured to transmit an RF signal to Transmitter/Uploader 130 and/or a conventional RFID reader. Antenna 210 is optionally tunable or configurable to operate at different frequencies or to exchange signals in particular directions.

Logger 150 includes a Power Circuit 220 configured to convert energy within an RF transmission received by Antenna 210 to electrical energy for operation Logger 150. For example, Power Circuit 220 may be configured to generate electrical energy to power a Processor 260 and a Log Data Storage 230.

Logger 150 includes Log Data Storage 230 configured to store log data. In some embodiments, the log data is stored in one or more data records, such as a Data Record 240A and/or Data Record 240B. In some embodiments, Log Data Storage 230 is configured to store logs of a plurality of events. For example, in some embodiments, Log Data Storage 230 is configured to store over 16, 32, 64, 128, 512, 1024 or 2028 events. In some embodiments Log Data Storage 230 includes 0.5K, 1K, 2K, 4K, 8K 16K, or 32K bytes, or more, of memory.

Log Data Storage 230 is typically configured to store log data relating to, or received from, Transmitter 120A, Transmitter 120B, Transmitter/Uploader 130, or the like. For example, in a typical embodiments, Log Data Storage 230 is configured to store time/data information and/or a transmitter ID, received from an RF transmission via Antenna 210. In these embodiments, after some time of use, Log Data Storage 230 may have stored a series of transmitter IDs, each optionally associated with time/data information. This data may be used to track (in space and time) Logger 150. For example Log Data Storage 230 may include data indicating which instances of Transmitter 120A, Transmitter 120B, or Transmitter/Uploader 130 that Logger 150 has passed near and when those events occurred. Precision of the location information may be responsive to the strength of the transmission. For example, Logger 150 must get closer to Transmitter 120A when the transmission from Transmitter 120A is weaker, in order for an event to be logged in Logger 150. Log Data Storage 230 includes non-volatile memory such as SDRAM, Flash memory, write once memory, or the like.

Logger 150 optionally includes a State Storage 250 configured to store a value indicating if Logger 150 is in the logging mode or the upload mode. State Storage 250 may be static (e.g., non-volatile) or volatile memory. For example, State Storage 250 may include SDRAM. In some embodiments, the value stored in State Storage 250 is changed by a command received from Transmitter 120A, Transmitter 120B, or Transmitter/Uploader 130. In some embodiments, State Storage 250 is changed when a transmission is received from Transmitter/Uploader 130. State Storage 250 is optional when the mode of Logger 150 is dependent on a communication status (e.g., a good communication link) or a physical connection to Logger 150.

Logger 150 includes a Processor 260 configured to extract data from a transmission received via Antenna 210. For example, Processor 260 may be configured to identify transmitter ID information, time/data data, or a command within a transmission received from Transmitter 120A, Transmitter 120B, or Transmitter/Uploader 130. Processor 260 may further be configured to change the value stored in State Storage 250 so as to change the mode of Logger 150 between the logging mode and the upload mode.

In various embodiments, Processor 260 is configured to manage logging of information received from Transmitter 120A, Transmitter 120B, and/or Transmitter/Uploader 130. For example, in some embodiments Processor 260 is configured such that only one transmission from a particular transmitter will be logged by a particular Logger 150 in a particular time period. This prevents the Logger 150 from logging multiple events as a result of being in the vicinity of a single transmitter for a period in which the transmitter transmits multiple data. With this feature, a transmitter can be configured to repetitively transmit the same or similar data. For example, the transmitter can transmit a transmitter ID and time/data information continuously. When this transmission is received by Logger 150 the first set of data is logged. Then, during a predetermined period, any transmission including the same transmitter ID is ignored. The predetermined time may be 1, 5, 10, 60 minutes or longer, depending the specific application for which the instance of Logger 150 is intended. The predetermined time may be stored in Logger 150 or may be part of the transmission received from Transmitter 120A, Transmitter 120B, or Transmitter/Uploader 130. For example, a transmitter located at an entrance to a storage are to may be configured with a one minute predetermined time, while a transmitter located within the storage area may be configured with a 24 hour delay time. In some embodiments, a transmitter may change transmitter ID in order to control when further data from the same transmitter is logged.

Logger 150 optionally includes a Sensor 270. Sensor 270 may be powered by energy generated by Power Circuit 220 using energy received in a transmission to Antenna 210. Sensor 270 may be a temperature sensor, humidity sensor, light sensor, environmental sensor, and/or the like. Data generated by Sensor 270 is optionally stored in Log Data Storage 230 and uploaded to Transmitter/Uploader 130.

Logger 150 optionally includes an Output 280 configured for uploading data from Log Data Storage 230 to Transmitter/Uploader 130. Output 280 is further configured to make electrical or optical contact between Logger 150 and Transmitter/Uploader 130, the contact being for uploading the data. In these embodiments, Transmitter/Uploader 130 need not include an RF transmitter. In various embodiments, Output 280 includes an electrical contact point, IR transmitter, visible light transmitter, controllable optic, or the like.

Logger 150 optionally includes an ID Data Storage 290 configured to store an ID of Logger 150, biometric data, personal data, shipping data, inventory data, and/or other data. Data stored in ID Data Storage 290 is optionally uploaded to Transmitter/Uploader 130 using Antenna 210 or Output 280. Using data stored in ID Data Storage 290, Logger 150 may operate as an RFID tag. This data stored in ID Data Storage 290 is optionally included in a radio frequency response to a received transmission from Transmitter 120A, Transmitter 120B or Transmitter/Uploader 130.

In various embodiments, Logger 150 is configured with a form factor (e.g., shape and size) similar to RFID tags known in the art.

A Shipment 140 (FIG. 1) may include one or more instances of Logger 150 configured to tag the entire Shipment 140 and/or specific items within Shipment 140. Shipment 140 may be scanned by Transmitter 120A, Transmitter 120B, and/or Transmitter/Uploader 130 as it travels along a Path 160. Instances of Transmitter 120A, Transmitter 120B, and/or Transmitter/Uploader 130 may be located within a single building, within a compound, within a distribution center, within a transportation system, within a supply chain, and/or the like. Tracking System 100 may include more instances of Transmitter 120A, Transmitter 120B, and/or Transmitter/Uploader 130 than is illustrated in FIG. 1.

Figures 3, 4:
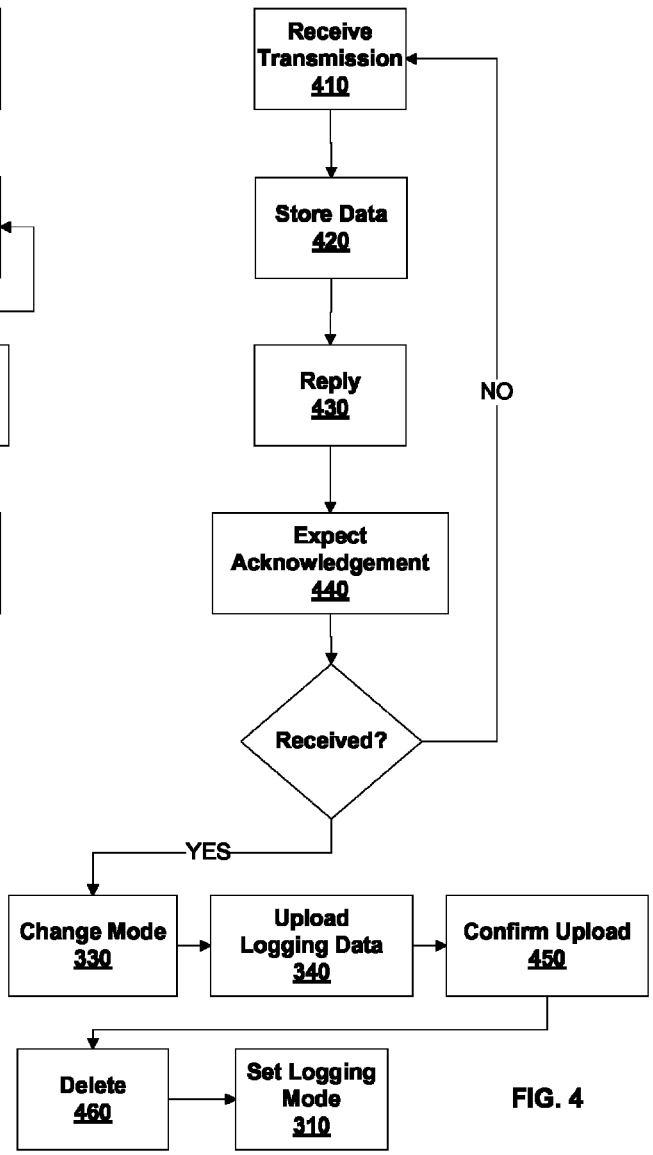
FIG. 3 illustrates a method according to various embodiments of the invention.
FIG. 4 illustrates a plurality of methods according to various embodiments of the invention.

FIG. 3 illustrates a method according to various embodiments of the invention. In this method, Logger 150 is initially placed in the logging mode, transmissions are logged, the mode is changed to the upload mode and data is uploaded. In a Set Logging Mode Step 310, the state of Logger 150 is set to the logging mode. Set Logging Mode Step 310 places Logger 150 in the logging mode and optionally includes changing a value stored in State Step 250. This step is optional when the logging mode is the default mode. As discussed elsewhere herein, in the logging mode Logger 150 is configured to log transmissions received from Transmitter 120A, Transmitter 120B, and/or Transmitter/Uploader 130.

In some, embodiments, Set Logging Mode Step 310 is performed in response to receipt of a transmission whose energy is insufficient to generate a response transmission. Thus, the logging mode is optionally set automatically when Power Circuit 220 does not generate at least a predetermined amount of electrical energy.

In some, embodiments, Set Logging Mode Step 310 is performed in response to failure of a handshaking process in which Logger 150 and Transmitter/Uploader 130. The handshaking process is configured to test and/or confirm the ability of RF communications between Logger 150 and Transmitter/Uploader 130 to accurately communicate data.

In some embodiments, Set Logging Mode Step 310 is performed in response to Logger 150 being physically disconnected from a device. For example, if Logger 150 is connected to Transmitter/Uploader 130, or some other device, via Output 280, breaking this connection may place Logger 150 in logging mode.

In some embodiments, Set Logging Mode Step 310 is performed upon receipt of a command or code from Transmitter 120A, Transmitter 120B, and/or Transmitter/Uploader 130. For example, Logger 150 may receive data via Antenna 210. The data may be processed by Processor 260 and, in response, Processor 260 may change a valued stored in State Storage 250. In some embodiments, Transmitter 120A and Transmitter 120B, and/or Transmitter/Uploader 130 are configured to include this command or code near the beginning of their transmission.

It is anticipated that Set Logging Mode Step 310 may be performed in response to other criteria and/or events.

In a Log Transmission Step 320, Logger 150 logs a transmission from Transmitter 120A, Transmitter 120B, and/or Transmitter/Uploader 130. The logged information is stored in Log Data Storage 230. The logged information may include identification data regarding Transmitter 120A, Transmitter 120B, and/or Transmitter/Uploader 130, time/date information, geographic information, sensor data, or the like. The logged information may be received in the transmission or be generated within Logger 150. For example, a serial number of Transmitter 120B may be received as data within the transmission and sensor data may be generated by Sensor 270. In some embodiments, all of the logged data is received within the transmission. The logging process is powered by electrical energy generated using Power Circuit 220 from a radio frequency transmission received by Antenna 210.

Log Transmission Step 320 typically includes receipt of a radio frequency signal from Transmitter 120A, Transmitter 120B, and/or Transmitter/Uploader 130 by Antenna 210. Energy from the transmission is used to generate electrical energy using Power Circuit 220. The electrical energy is used to power Processor 260. Processor 260 is used to parse the received transmission to identifying data within the transmission. Some or all of the identified data is stored in Log Data Storage 230 as all or part of the logged information.

In a Change Mode Step 330, the mode of Logger 150 is changed to the upload mode. In this mode data may be uploaded from Logger 150 to Transmitter/Uploader 130. The uploaded data is data that was stored in Log Data Storage 230, ID Data Storage 290, and/or data generated using Sensor 270. In some embodiments, the uploading is accomplished using Antenna 210. In these embodiments, the uploading is optionally powered using electrical energy generated by Power Circuit 220 from a transmission received by Antenna 210.

In some embodiments, Change Mode Step 330, is made in response to receipt of a command from Transmitter 120A, Transmitter 120B, and/or Transmitter/Uploader 130 via Antenna 210. For example, Transmitter/Uploader 130 may transmit a "SETUPLOADMODE" command to LOGGER 150. When Logger 150 receives this command, the command is identified by Processor 260 and the mode of Logger 150 is changed in response. In some embodiments, this mode change includes changing a valued in State Storage 250. In some, embodiments, the SETUPLOADMODE command may include a parameter configured to be compared with identification information stored in ID Data Storage. This parameter may be used to change the mode of a specific instance of Logger 150 without changing the modes of other instances of Logger 150. For example, Logger 150 may be configured to change mode only if the parameter and the identification information match. In these embodiments, the parameter may be compared with all or part of the identification information in order to change the mode of one or a set of Logger 150, respectively. In some embodiments, setting the mode of Logger 150 and/or actually uploading data from Logger 150 requires an access code. In these embodiments, Processor 260 may be configured to require this access code. The access code is optionally encrypted.

In some embodiments, Change Mode Step 330 occurs in response to making a physical or optical connection to Output 280. For example, Change Mode Step 330 may be initiated by physically connecting Logger 150 to Transmitter/Uploader 130. In these embodiments, Transmitter/Uploader 130 need not include a radio frequency transmitter.

In some embodiments, Change Mode Step 330 occurs in response to operation of a switch (not shown) within Logger 150. Such a switch is disclosed in commonly owned U.S. nonprovisional patent application Ser. No. 11/382,054 filed May 8, 2006 and Ser. No. 11/382,052 filed May 7, 2006. The disclosures of the above nonprovisional patent applications are hereby incorporated herein by reference.

In some embodiments, Change Mode Step 330 occurs in response to establishment of communication channel between Transmitter/Uploader 130 and Logger 150. For example, in one embodiment, Transmitter/Uploader 130 and Logger 150 are configured to undergo a handshaking routine in order to determine the presence of sufficient communication reliability to upload logged data. The handshaking routine may establish that there is sufficient energy to send a response transmission.

In some embodiments, Change Mode Step 330 occurs in response to sufficient energy being generated by Power Circuit 220. In these embodiments, when the energy reaches a predetermined level, Logger 150 is automatically switched from logging mode to upload mode. In some embodiments, that the energy has reached the predetermined level is indicated by a voltage becoming high enough to overcome a junction potential.

Change Mode Step 330 is optionally response to criteria and/or events. Change Mode Step 330 may occur when communications with Logger 150 are easier. For example, the mode of Logger 150 may be changed when items within Shipment 140 have been separated and placed on a conveyer belt. Once an item is on the conveyer belt, Transmitter/Uploader 130 may be disposed closer to Logger 150 and there may be less interference from nearby instances of Logger 150.

In Upload Logging Data Step 340 data is uploaded from Logger 150 to Transmitter/Uploader 130. The data uploaded can be data stored in Log Data Storage 230 during the logging mode. This stored data can be representative of a plurality of logging events. For example, the stored data may be representative of various logging events that occurred since the last upload. The data uploaded may further include data stored in ID Data Storage 290 or data generated using Sensor 270.

In some embodiments, the data is uploaded using Antenna 210 and energy generated using Power Circuit 220 from a transmission received by Antenna 120. In some embodiments the data is uploaded using Output 280. In some embodiments, the data is uploaded using power received through a physical or optical connection to Transmitter/Uploader 130. In some embodiments, an access code must be received by Logger 150 before data is uploaded.

FIG. 4 illustrates a plurality of methods according to various embodiments of the invention. In some of these methods, Logger 150 automatically changes between the logging mode and the uploading mode based on communications with Transmitter/Uploader 130. In some of these methods, Logger 150 changes between logging mode and uploading mode when an instance of Logger 150 is specifically addressed using identification data for the instance of Logger 150. In some embodiments, Logger 150 changes between the logging mode and the uploading mode responsive to one or more commands received through an RF transmission. In some embodiments, Logger 150 changes between logging mode and uploading mode responsive to manipulation of an optical, a mechanical or electrical switch included in Logger 150.

In a Receive Transmission Step 410, Logger 150 receives a transmission from an instance of Transmitter/Uploader 130. This transmission is received by Antenna 210 and is used by Power Circuit 220 to generate electrical power. The transmission optionally includes data configured to identify the instance of Transmitter/Uploader 130, time/date data, sensor data, commands, codes, or the like.

In an optional Store Data Step 420, data received in the transmission of Receive Transmission Step 410 is stored in Log Data Storage 230. This data may be stored in a Data Record 240A or 240B. The storage process is powered by electrical energy produced by Power Circuit 220 from the received transmission.

In a Reply Step 430 Logger 150 uses Antenna 210 to send a response signal to Transmitter/Uploader 130. This response signal optionally includes data identifying Logger 150. For example, the response may include identification data retrieved from ID Data Storage 290. Reply Step 430 optionally includes setting a state variable in static memory within Logger 150. This state variable may be used to determine that a response signal has been sent to a particular instance of Transmitter/Uploader 130, when Logger 150 next operates.

In an Expect Acknowledgement Step 440, Logger 150 determines if an acknowledgement of the response signal has been received by Logger 150 from Transmitter/Uploader 130. The acknowledgement optionally includes information identifying it as an acknowledgement. The acknowledgement further optionally includes data identifying the particular instance of Logger 150. In some embodiments the receipt of an acknowledgement address to a particular instance of Logger 150 is interpreted by the Logger 150 as an indication that the prior steps have already occurred.

If no acknowledgement is received, then the method returns to receive Transmission Step 410. If an acknowledgement is received, then the method proceeds to Change Mode Step 330 and Upload Logging Data Step 340.

In an optional Confirm Upload Step 450, Logger 150 communicates with Transmitter/Uploader 130 in order to confirm successful uploading of the data in Upload Logging Data Step 340. In some embodiments, this communication includes a transmission from Transmitter/Uploader 340 to Logger 150 confirming receipt of the data.

In an optional Delete Step 460, the uploaded data is deleted from Log Data Storage 230. Delete Step 460 may be conditional on receiving the confirmation of Confirm Upload Step 450. In an optional Set Logging Mode 310, Logger 150 is set back to the logging mode.

Several embodiments are specifically illustrated and/or described herein. However, it will be appreciated that modifications and variations are covered by the above teachings and within the scope of the appended claims without departing from the spirit and intended scope thereof. For example, the logging mode may include transmissions from Logger 150 to Transmitter 120A, Transmitter 120B, and/or Transmitter/Uploader 130. In these embodiments, Logger 150 may optionally operate in response to Transmitter 120A or Transmitter 120B as a prior art RFID tag with the exception that transmissions are logged and logging information stored in Logger 150. In some embodiments, Logger 150 is configured to operate in three modes: an RFID mode of the prior art, the logging mode and the uploading mode. These modes are not necessarily mutually exclusive. Thus, the RFID mode may be combined with aspects of the logging mode and the uploading mode.

Logger 150 is optionally included in an identity documents such as a driver's license, passport, immigration document, vehicle registration, immigration document, membership card, key card, library card, student card, or the like. Logger 150 is optionally included in a financial instrument such as a credit card, debit card, bank card, check cart, traveler's check, payment fob, or the like. In these embodiments, Logger 150 may be configured to log passage through an immigration point, travel, or a financial transaction, etc. Such logging may be used to prevent fraud.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. A method comprising:
   receiving, using a passive RFID tag, a first radio frequency transmission including first identification data configured to identify a sender of the first radio frequency transmission;
   using the first radio frequency transmission to generate first electrical energy;
   storing the first identification data in a log data storage using the first electrical energy;
   receiving a second radio frequency transmission including second identification data configured to identify a sender of the second radio frequency transmission;
   using the second radio frequency transmission to generate second electrical energy;
   storing the second identification data in the log data storage using the second electrical energy;
   switching from a logging mode to an upload mode, where switching from the logging mode to the upload mode includes using a circuit to change a state value stored in a static storage location, the state value being a digital value indicative of the logging mode; and
   uploading the first identification data and the second identification data stored in the log data storage, in the upload mode.

2. The method of claim 1, wherein switching from the logging mode to the upload mode is responsive to a radio frequency signal.

3. The method of claim 1, wherein switching from the logging mode to the upload mode is responsive to an identity of a received command.

4. The method of claim 1, wherein switching from the logging mode to the upload mode is responsive to a handshaking routine.

5. The method of claim 1, wherein switching form the logging mode to the upload mode is responsive to a radio frequency.

6. The method of claim 1, wherein switching from the logging mode to the upload mode is responsive to receiving data identifying a data logger including the log data storage.

7. The method of claim 1, wherein switching from the logging mode to the upload mode is responsive to a third radio frequency transmission.

8. The method of claim 1, wherein switching from the logging mode to the upload mode is responsive to a frequency of a third radio frequency transmission.

9. The method of claim 1, wherein switching from the logging mode to the upload mode is responsive to manipulation of a mechanical or electrical switch included in a data logger, the data logger including the log data storage.

10. The method of claim 1, wherein switching between the logging mode and the upload mode is automatic after the step of storing the second identification data.

11. The method of claim 1, further including sending a response to the second radio frequency transmission, receiving an acknowledgement of the response, and changing from the logging mode to the upload responsive to the acknowledgement.

12. The method of claim 1, further including receiving a confirmation that the uploading of the first and second identification was successful and, in response, deleting the first and second identification data from the log data storage.

13. The method of claim 1, wherein uploading the first and second identification data is performed using energy generated from a third radio frequency transmission.

14. The method of claim 1, wherein uploading of the first and second identification data is performed using a physical connection from the log data storage to an external device.

15. The method of claim 1, wherein connection to an external device automatically results in a change from the logging mode to the upload mode.

16. The method of claim 1, wherein the first radio frequency transmission and the second radio frequency transmission are each not strong enough to provide a radio frequency response signal.

17. The method of claim 1, wherein the presence of many data loggers cannot interfere with receipt of the first radio frequency transmission, and cannot interfere with uploading the first identification data and the second identification data.

18. The method of claim 1, wherein both the second identification data and the first identification data are received and stored in the logging mode before the step of switching from the logging mode to the upload mode.

19. The method of claim 1, wherein switching from the logging mode to the upload mode is responsive to a specific upload command.

20. The method of claim 1, wherein receiving of the first radio frequency transmission, receiving of the second radio frequency transmission and the uploading each occurs at a different location of a shipment.

21. The method of claim 1, wherein the step of uploading the first identification data and the second identification data does not use the first electrical energy or the second electrical energy.

22. The method of claim 1, wherein switching from the logging mode to the upload mode is dependent on receiving an identifier of a specific logger.

23. The method of claim 1, wherein the static storage location is a static storage location of the passive RFID tag, the state value including a digital value indicative of whether the RFID tag is in alternatively the logging mode or the upload mode.

24. The method of claim 1, wherein the first replay signal is a wireless signal.

25. The method of claim 1, wherein the first radio frequency signal includes time information.

26. The method of claim 1, further comprising generating data using a sensor and the first electrical energy.

27. The method of claim 1, wherein the first identification information is stored in the log data storage in association with time of day information.

28. The method of claim 1, further comprising determining when communication reliability is sufficient to send a reply signal, the reply signal being a reply to the first radio frequency transmission.

29. The method of claim 1, wherein the sender of the first radio frequency transmission and the sender of the second radio frequency transmission are different senders.

30. The method of claim 1, wherein the sender of the first radio frequency transmission and the sender of the second radio frequency transmission is the same sender.

* * * * *